(12) United States Patent
Uhl

(10) Patent No.: US 9,226,478 B1
(45) Date of Patent: Jan. 5, 2016

(54) ELEVATED PET FEEDING APPARATUS

(71) Applicant: Brian Uhl, Myrtle Beach, SC (US)

(72) Inventor: Brian Uhl, Myrtle Beach, SC (US)

( * ) Notice: Subject to any disclaimer, the term of this patent is extended or adjusted under 35 U.S.C. 154(b) by 0 days.

(21) Appl. No.: 14/728,669

(22) Filed: Jun. 2, 2015

(51) Int. Cl.
| | | |
|---|---|---|
| *A01K 5/01* | (2006.01) | |
| *F16M 11/16* | (2006.01) | |
| *F16M 11/06* | (2006.01) | |
| *A01K 29/00* | (2006.01) | |

(52) U.S. Cl.
CPC ............. *A01K 5/0114* (2013.01); *A01K 29/00* (2013.01); *F16M 11/06* (2013.01); *F16M 11/16* (2013.01); *F16M 2200/00* (2013.01); *F16M 2200/08* (2013.01)

(58) Field of Classification Search
CPC ..... A01K 5/0114; A01K 5/01; A01K 5/0128; A01K 1/10; A01K 1/0356; A01K 1/0135; A01K 29/00; A01K 7/00; A01K 7/005; A01K 39/014
USPC ......... 248/133, 132, 130, 139, 158, 161, 157, 248/163.1; 119/61.5, 61.56, 51.5, 61.57, 119/484
See application file for complete search history.

(56) References Cited

U.S. PATENT DOCUMENTS

| | | | | | |
|---|---|---|---|---|---|
| 513,557 | A | * | 1/1894 | Cobb | A01K 5/01 119/58 |
| 514,203 | A | * | 2/1894 | Schmidt | A01K 5/01 119/61.1 |
| 1,855,314 | A | * | 4/1932 | Schacht | A01K 5/01 119/51.5 |
| 2,742,877 | A | * | 4/1956 | Stoner | A01K 5/01 119/61.1 |
| 3,141,090 | A | * | 7/1964 | Batcher | A47J 36/2483 219/438 |
| 3,651,787 | A | | 3/1972 | Cooper | |
| 4,044,723 | A | * | 8/1977 | Fitzpatrick | A01K 5/0114 119/51.5 |
| 4,658,759 | A | * | 4/1987 | Brown | A01K 5/0114 119/61.5 |
| 4,976,223 | A | * | 12/1990 | Pierce | A01K 5/0114 119/61.56 |
| 5,141,194 | A | * | 8/1992 | Burgess et al. | B60N 3/102 248/150 |
| 5,299,861 | A | * | 4/1994 | Foliot et al. | A47B 41/00 108/25 |
| 5,649,499 | A | | 7/1997 | Krietzman et al. | |
| D424,759 | S | * | 5/2000 | Sipka | D30/130 |
| 6,622,653 | B1 | * | 9/2003 | Starnes, Jr. | A01K 5/01 119/51.01 |
| 7,658,267 | B1 | * | 2/2010 | Welsh | B63C 11/22 108/25 |
| 8,516,975 | B2 | | 8/2013 | Becattini, Jr. et al. | |
| 2009/0293811 | A1 | * | 12/2009 | Wersal | A01K 5/01 119/57.92 |

* cited by examiner

*Primary Examiner* — Nkeisha Smith
(74) *Attorney, Agent, or Firm* — Crossley Patent Law

(57) ABSTRACT

An elevated pet feeding apparatus including an elevated base, a plurality of legs disposed on a lower surface of the base, a pair of lower support columns disposed on an upper surface of the base, a pair of upper support columns, a pair of pins configured to adjustably mount the pair of upper support columns within the pair of lower support columns, a pair of V-shaped support frames rotatably secured to a top side of the pair of upper support columns, a platform disposed atop the pair of support frames, and a pair of circular apertures disposed in the platform.

9 Claims, 4 Drawing Sheets

ELEVATED PET FEEDING APPARATUS

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various types of pet feeding devices are known in the prior art. However, what has been needed is an elevated pet feeding apparatus including an elevated base, a plurality of legs disposed on a lower surface of the base, a pair of lower support columns disposed on an upper surface of the base, a pair of upper support columns, a pair of pins configured to adjustably mount the pair of upper support columns within the pair of lower support columns, a pair of V-shaped support frames rotatably secured to a top side of the pair of upper support columns, a platform disposed atop the pair of support frames, and a pair of circular apertures disposed in the platform. What has been further needed is for the pair of support frames to be configured to allow a user to manually adjust an angle of the platform toward and alternately away from a pet in order to properly align a pair of pet food bowls based on a height of the pet. With the pair of upper support columns adjustably mountable to the pair of lower support columns and the manual adjustability of the platform, a user can adjust not only the height but the angle of the pair of pet food bowls to better suit the needs of his pet. This double adjustability feature better enables the pet to eat in an anatomically correct position for improved digestion. The apparatus, which is optionally plastic, is lightweight, portable, and easy to clean. Furthermore, the base can double as a step for the pet to better reach the pair of pet food bowls.

FIELD OF THE INVENTION

The present invention relates to pet feeding devices, and more particularly, to an elevated pet feeding apparatus.

SUMMARY OF THE INVENTION

The general purpose of the present elevated pet feeding apparatus, described subsequently in greater detail, is to provide a pet feeding device which has many novel features that result in an elevated pet feeding apparatus which is not anticipated, rendered obvious, suggested, or even implied by prior art, either alone or in combination thereof.

To accomplish this, the present elevated pet feeding apparatus includes an elevated base, a plurality of legs, a pair of lower support columns, a pair of openings, a pair of orifices, a pair of upper support columns, a plurality of a pair of slots, a pair of pins, a pair of V-shaped support frames, a platform, and a pair of circular apertures. The elevated base has an upper surface, a lower surface, a right front side, a left front side, a right back side, and a left back side. The plurality of legs includes a right front leg, a left front leg, a right back leg, and a left back leg. Each of the right front leg, the left front leg, the right back leg, and the left back leg is attached to the lower surface of the base proximal the right front side, the left front side, the right back side, and the left back side, respectively. The pair of lower support columns includes a right lower support column and a left lower support column. Each of the right lower support column and the left lower support column has a bottom end, a top end, a right side, and a left side. The bottom end of each of the right lower support column and the left lower support column is attached to the upper surface of the base proximal the right back side and the left back side, respectively.

The pair of openings includes a right opening and a left opening. Each of the right opening and the left opening is disposed within the right lower support column and the left lower support column, respectively, from the top end to the bottom end. The pair of orifices includes a right orifice and a left orifice. Each of the right orifice and the left orifice is disposed through the right side of the right lower support column and the left side of the left lower support column, respectively, proximal the top end. The pair of upper support columns includes a right upper support column and a left upper support column. Each of the right upper support column and the left upper support column is slidably engaged within the right opening and the left opening, respectively. Each of the pair of slots of the plurality of a pair of slots includes a right slot colinearly disposed with a left slot. The right slot of each of the pair of slots is disposed through the right upper support column, and the left slot of each of the pair of slots is disposed through the left upper support column. A circumference of one of the right orifice and the left orifice substantially conforms to a circumference of one of a right slot and a left slot.

The pair of pins includes a right pin and a left pin. The right pin is disposed through the right orifice and one of a right slot, and the left pin is disposed through the left orifice and one of a left slot. The right pin is configured to adjustably mount the right upper support column within the right lower support column. The left pin is configured to adjustably mount the left upper support column within the left lower support column.

The pair of V-shaped support frames includes a right support frame and a left support frame. Each of the right support frame and the left support frame is rotatably secured to a top side of the right upper support column and the left upper support column, respectively, with a respective right wingnut and a left wingnut. The platform is disposed atop the pair of V-shaped support frames. The platform has a top area, a bottom area, a right surface, and a left surface. The pair of circular apertures includes a right aperture and a left aperture. Each of the right aperture and the left aperture is disposed in the platform proximal the right surface and the left surface, respectively, from the top area to the bottom area. The pair of apertures is configured to hold a pair of pet food bowls within the platform. The pair of support frames is configured to allow a user to manually adjust an angle of the platform toward and alternately away from a pet in order to properly align the pair of pet food bowls based on a height of the pet.

The base, each of the pair of lower support columns, and the platforms are optionally rectangular. Each of the plurality of legs is optionally cylindrical. A length of the base optionally substantially conforms to a length of the platform. The length of the base is optionally eighteen inches. A width of each of the pair of lower support columns is optionally one and a half inches.

Thus has been broadly outlined the more important features of the present elevated pet feeding apparatus so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
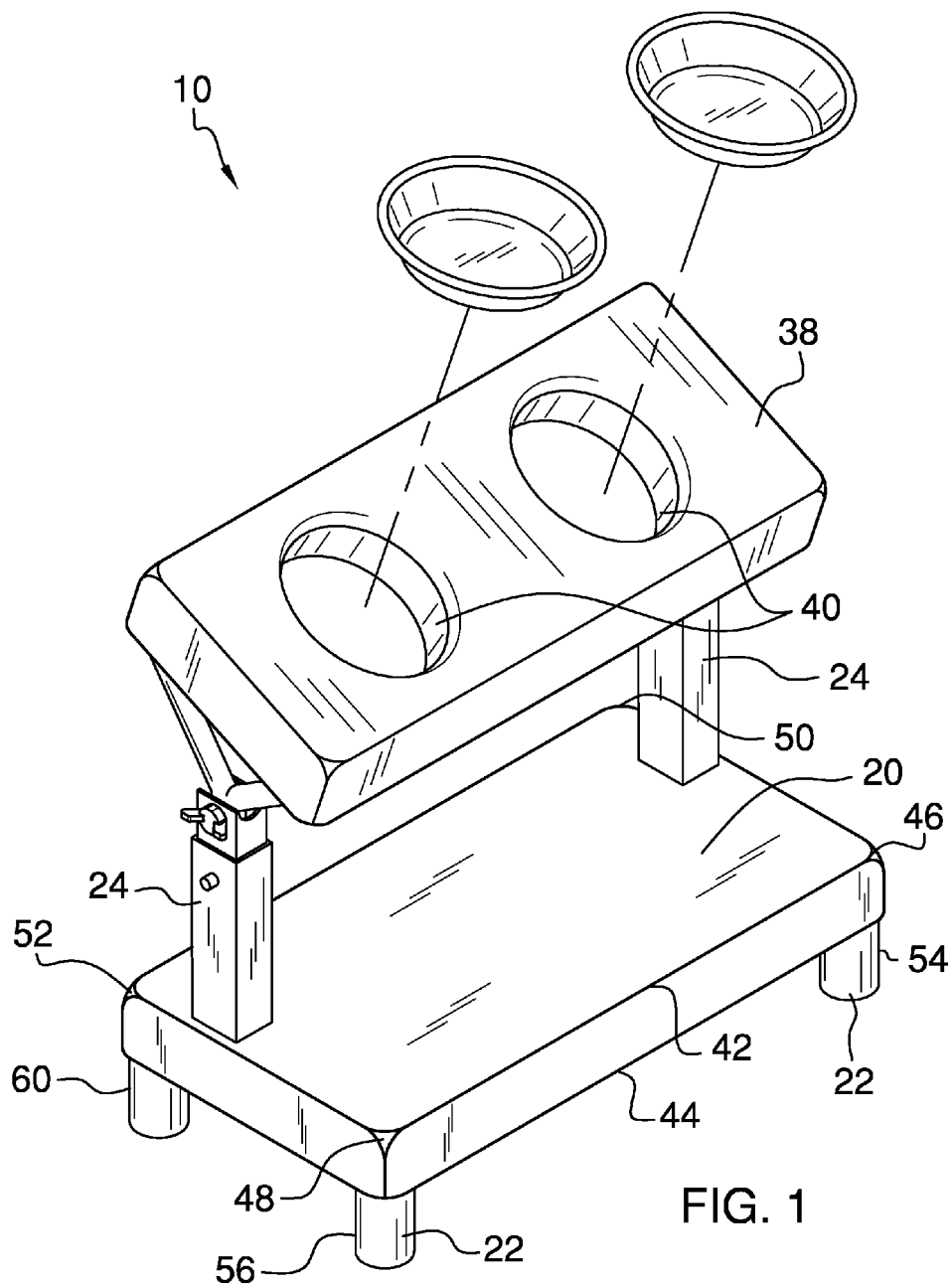
FIG. 1 is an exploded view showing a pair of pet bowls atop a pair of apertures.
Figure 2:
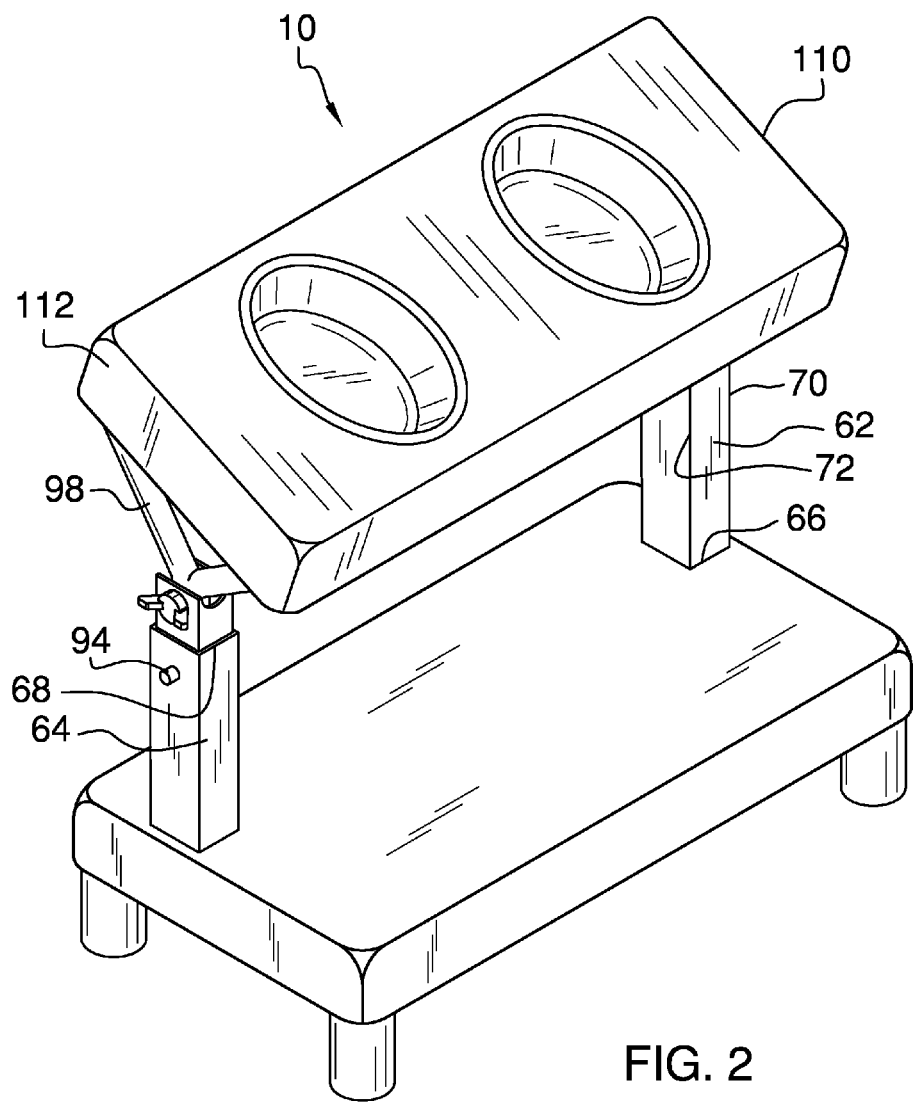
FIG. 2 is a front isometric view.
Figure 3:
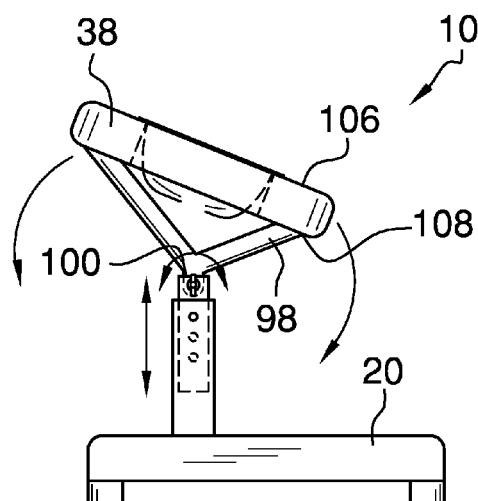
FIG. 3 is a side elevation view.
Figure 4:
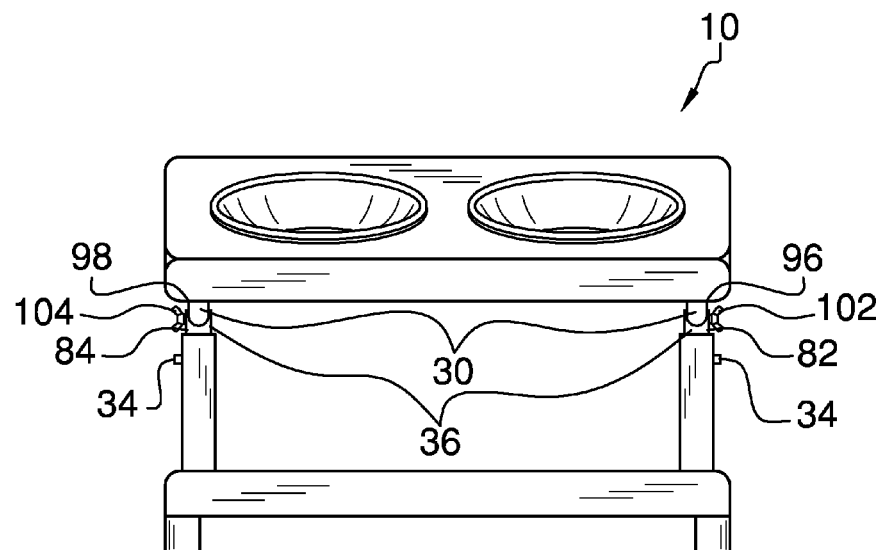
FIG. 4 is a front elevation view.
Figure 5:
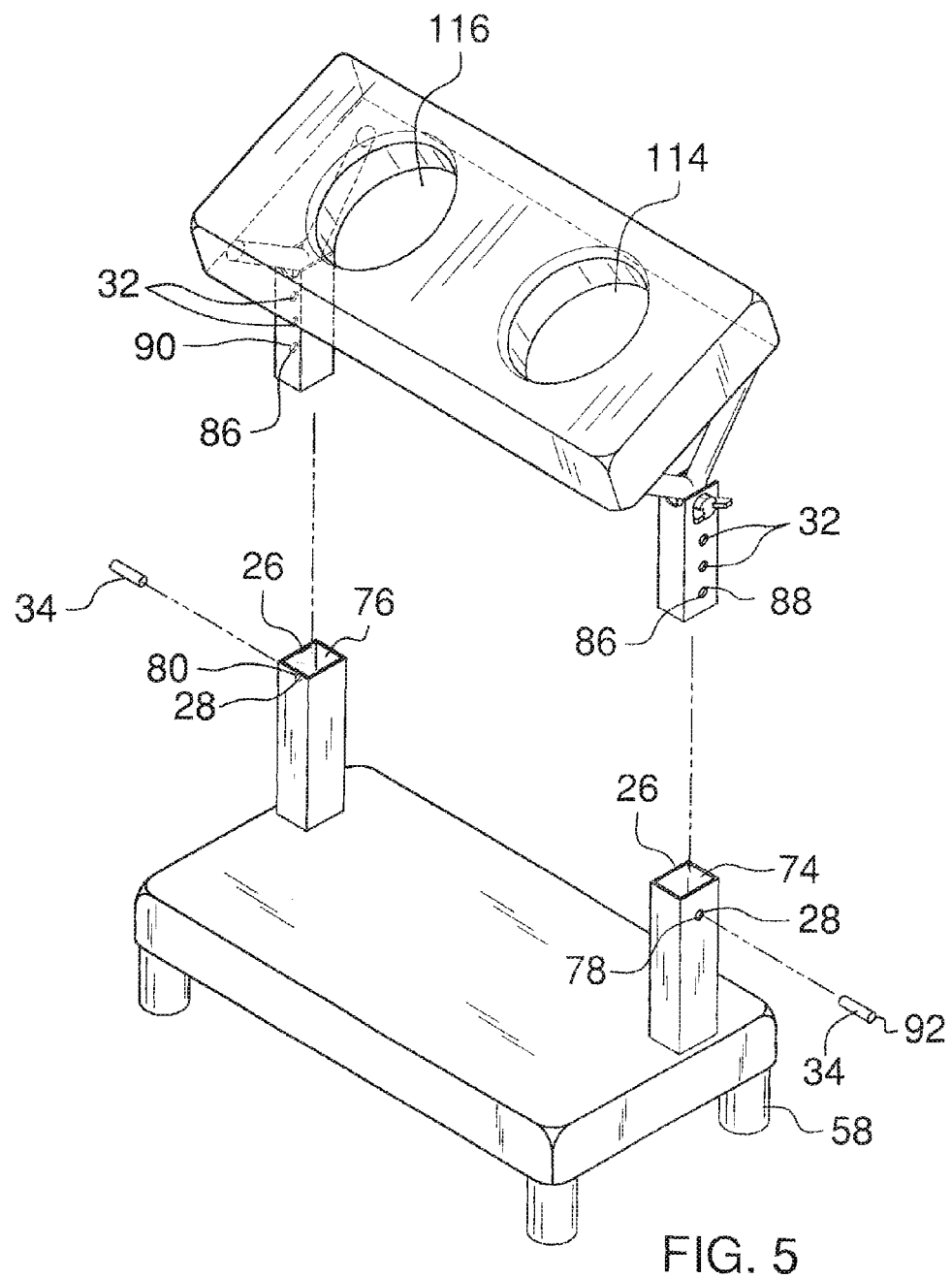
FIG. 5 is an exploded view.

With reference now to the drawings, and in particular FIGS. 1 through 5 thereof, an example of the instant elevated pet feeding apparatus employing the principles and concepts of the present elevated pet feeding apparatus and generally designated by the reference number 10 will be described.

Referring to FIGS. 1 through 5 the present elevated pet feeding apparatus 10 is illustrated. The elevated pet feeding apparatus 10 includes an elevated base 20, a plurality of legs 22, a pair of lower support columns 24, a pair of openings 26, a pair of orifices 28, a pair of upper support columns 30, a plurality of a pair of slots 32, a pair of pins 34, a pair of V-shaped support frames 36, a platform 38, and a pair of circular apertures 40. The elevated base 20 has an upper surface 42, a lower surface 44, a right front side 46, a left front side 48, a right back side 50, and a left back side 52. The plurality of legs 22 includes a right front leg 54, a left front leg 56, a right back leg 58, and a left back leg 60. Each of the right front leg 54, the left front leg 56, the right back leg 58, and the left back leg 60 is attached to the lower surface 44 of the base 20 proximal the right front side 46, the left front side 48, the right back side 50, and the left back side 52, respectively. The pair of lower support columns 24 includes a right lower support column 62 and a left lower support column 64. Each of the right lower support column 62 and the left lower support column 64 has a bottom end 66, a top end 68, a right side 70, and a left side 72. The bottom end 66 of each of the right lower support column 62 and the left lower support column 64 is attached to the upper surface 42 of the base 20 proximal the right back side 50 and the left back side 52, respectively.

The pair of openings 26 includes a right opening 74 and a left opening 76. Each of the right opening 74 and the left opening 76 is disposed within the right lower support column 62 and the left lower support column 64, respectively, from the top end 68 to the bottom end 66. The pair of orifices 28 includes a right orifice 78 and a left orifice 80. Each of the right orifice 78 and the left orifice 80 is disposed through the right side 70 of the right lower support column 62 and the left side 72 of the left lower support column 64, respectively, proximal the top end 68. The pair of upper support columns 30 includes a right upper support column 82 and a left upper support column 84. Each of the right upper support column 82 and the left upper support column 84 is slidably engaged within the right opening 74 and the left opening 76, respectively. Each of the pair of slots 86 of the plurality of a pair of slots 32 includes a right slot 88 colinearly disposed with a left slot 90. The right slot 88 of each of the pair of slots 32 is disposed through the right upper support column 82, and the left slot 90 of each of the pair of slots 32 is disposed through the left upper support column 84.

The pair of pins 34 includes a right pin 92 and a left pin 94. The right pin 92 is disposed through the right orifice 78 and one of a right slot 88, and the left pin 94 is disposed through the left orifice 80 and one of a left slot 90.

The pair of V-shaped support frames 36 includes a right support frame 96 and a left support frame 98. Each of the right support frame 96 and the left support frame 98 is rotatably secured to a top side 100 of the right upper support column 82 and the left upper support column 84, respectively, with a respective right wingnut 102 and a left wingnut 104. The platform 38 is disposed atop the pair of V-shaped support frames 36. The platform 38 has a top area 106, a bottom area 108, a right surface 110, and a left surface 112. The pair of circular apertures 40 includes a right aperture 114 and a left aperture 116. Each of the right aperture 114 and the left aperture 116 is disposed in the platform 38 proximal the right surface 110 and the left surface 112, respectively, from the top area 106 to the bottom area 108.

What is claimed is:
1. An elevated pet feeding apparatus comprising:
an elevated base having an upper surface, a lower surface, a right front side, a left front side, a right back side, and a left back side;
a plurality of legs comprising a right front leg, a left front leg, a right back leg, and a left back leg, each of the right front leg, the left front leg, the right back leg, and the left back leg attached to the base lower surface proximal the right front side, the left front side, the right back side, and the left back side, respectively;
a pair of lower support columns comprising a right lower support column and a left lower support column, each of the right lower support column and the left lower support column having a bottom end, a top end, a right side, and a left side, the bottom end of each of the right lower support column and the left lower support column attached to the base upper surface proximal the right back side and the left back side, respectively;
a pair of openings comprising a right opening and a left opening, each of the right opening and the left opening disposed within the right lower support column and the left lower support column, respectively, from the top end to the bottom end;
a pair of orifices comprising a right orifice and a left orifice, each of the right orifice and the left orifice disposed through the right lower support column right side and the left lower support column left side, respectively, proximal the top end;
a pair of upper support columns comprising a right upper support column and a left upper support column, each of the right upper support column and the left upper support column slidably engaged within the right opening and the left opening, respectively;
a plurality of a pair of slots, each of the pair of slots comprising a right slot colinearly disposed with a left slot, wherein the right slot of each of the pair of slots is disposed through the right upper support column, wherein the left slot of each of the pair of slots is disposed through the left upper support column;
wherein a circumference of one of the right orifice and the left orifice substantially conforms to a circumference of one of a right slot and a left slot;
a pair of pins comprising a right pin and a left pin, wherein the right pin is disposed through the right orifice and one of a right slot, wherein the left pin is disposed through the left orifice and one of a left slot;

wherein the right pin is configured to adjustably mount the right upper support column within the right lower support column;

wherein the left pin is configured to adjustably mount the left upper support column within the left lower support column;

a pair of V-shaped support frames comprising a right support frame and a left support frame, each of the right support frame and the left support frame rotatably secured to a top side of the right upper support column and the left upper support column, respectively, with a respective right wingnut and a left wingnut;

a platform disposed atop the pair of support frames, the platform having a top area, a bottom area, a right surface, and a left surface; and a pair of circular apertures comprising a right aperture and a left aperture, each of the right aperture and the left aperture disposed in the platform proximal the right surface and the left surface, respectively, from the top area to the bottom area;

wherein the pair of apertures is configured to hold a pair of pet food bowls within the platform;

wherein the pair of support frames is configured to allow a user to manually adjust an angle of the platform toward and alternately away from a pet in order to properly align the pair of pet food bowls based on a height of the pet.

2. The elevated pet feeding apparatus of claim 1 wherein the base is rectangular.

3. The elevated pet feeding apparatus of claim 2 wherein each of the plurality of legs is cylindrical.

4. The elevated pet feeding apparatus of claim 3 wherein the platform is rectangular.

5. The elevated pet feeding apparatus of claim 4 wherein each of the pair of lower support columns is rectangular.

6. The elevated pet feeding apparatus of claim 1 wherein a length of the base substantially conforms to a length of the platform.

7. The elevated pet feeding apparatus of claim 6 wherein the length of the base is eighteen inches.

8. The elevated pet feeding apparatus of claim 7 wherein a width of each of the pair of lower support columns is one and a half inches.

9. An elevated pet feeding apparatus comprising:

an elevated rectangular base having an upper surface, a lower surface, a right front side, a left front side, a right back side, and a left back side;

a plurality of cylindrical legs comprising a right front leg, a left front leg, a right back leg, and a left back leg, each of the right front leg, the left front leg, the right back leg, and the left back leg attached to the base lower surface proximal the right front side, the left front side, the right back side, and the left back side, respectively;

a pair of rectangular lower support columns comprising a right lower support column and a left lower support column, each of the right lower support column and the left lower support column having a bottom end, a top end, a right side, and a left side, the bottom end of each of the right lower support column and the left lower support column attached to the base upper surface proximal the right back side and the left back side, respectively;

wherein a width of each of the pair of lower support columns is one and a half inches;

a pair of openings comprising a right opening and a left opening, each of the right opening and the left opening disposed within the right lower support column and the left lower support column, respectively, from the top end to the bottom end;

a pair of orifices comprising a right orifice and a left orifice, each of the right orifice and the left orifice disposed through the right lower support column right side and the left lower support column left side, respectively, proximal the top end;

a pair of upper support columns comprising a right upper support column and a left upper support column, each of the right upper support column and the left upper support column slidably engaged within the right opening and the left opening, respectively;

a plurality of a pair of slots, each of the pair of slots comprising a right slot colinearly disposed with a left slot, wherein the right slot of each of the pair of slots is disposed through the right upper support column, wherein the left slot of each of the pair of slots is disposed through the left upper support column;

wherein a circumference of one of the right orifice and the left orifice substantially conforms to a circumference of one of a right slot and a left slot;

a pair of pins comprising a right pin and a left pin, wherein the right pin is disposed through the right orifice and one of a right slot, wherein the left pin is disposed through the left orifice and one of a left slot;

wherein the right pin is configured to adjustably mount the right upper support column within the right lower support column;

wherein the left pin is configured to adjustably mount the left upper support column within the left lower support column;

a pair of V-shaped support frames comprising a right support frame and a left support frame, each of the right support frame and the left support frame rotatably secured to a top side of the right upper support column and the left upper support column, respectively, with a respective right wingnut and a left wingnut;

a rectangular platform disposed atop the pair of support frames, the platform having a top area, a bottom area, a right surface, and a left surface;

wherein a length of the base substantially conforms to a length of the platform;

wherein a length of the base is eighteen inches; and a pair of circular apertures comprising a right aperture and a left aperture, each of the right aperture and the left aperture disposed in the platform proximal the right surface and the left surface, respectively, from the top area to the bottom area;

wherein the pair of apertures is configured to hold a pair of pet food bowls within the platform;

wherein the pair of support frames is configured to allow a user to manually adjust an angle of the platform toward and alternately away from a pet in order to properly align the pair of pet food bowls based on a height of the pet.

\* \* \* \* \*